A. Bassford,
Billiard Table,
No. 155, Reissued Dec. 25, 1849.
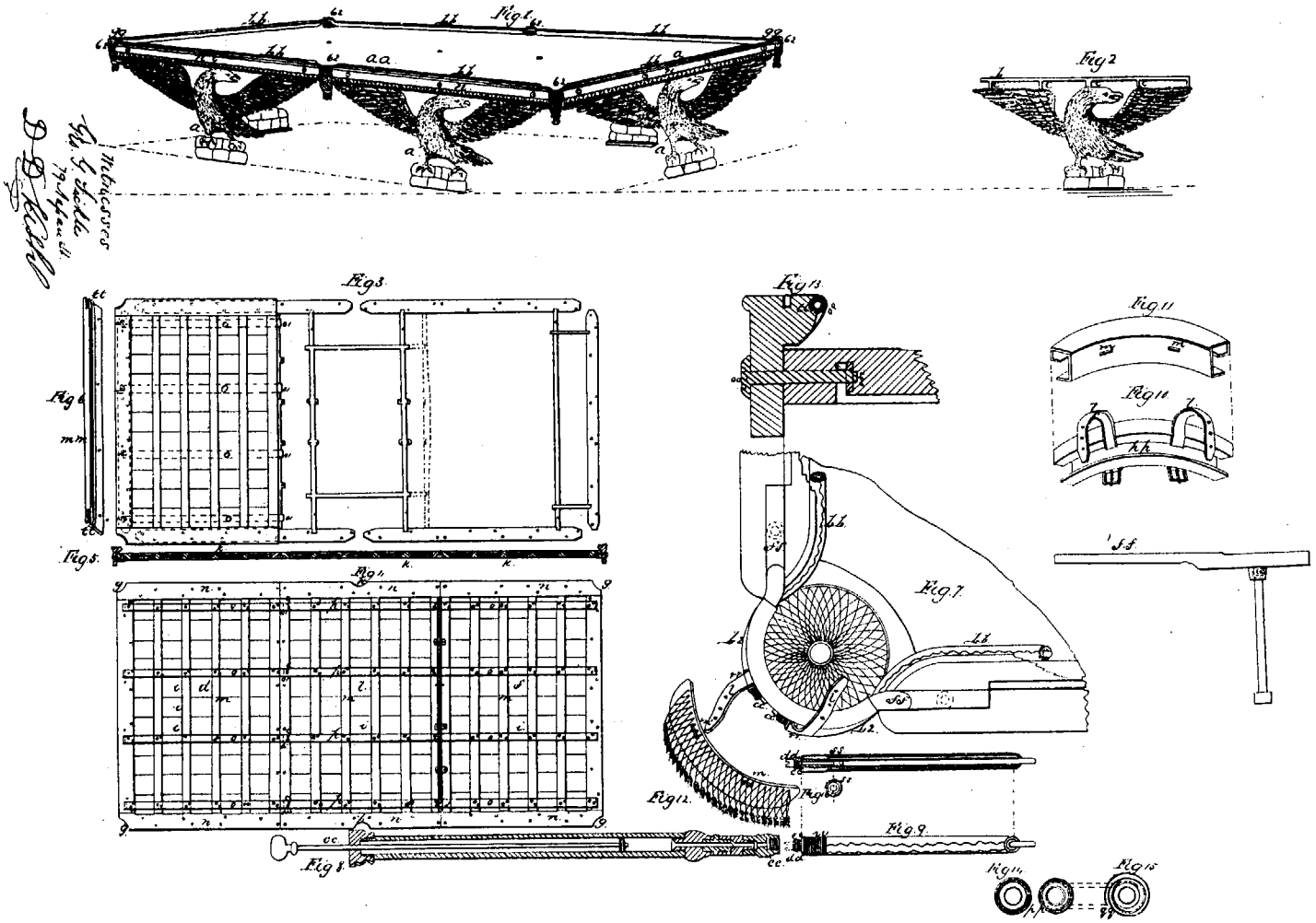
AM. PHOTO-LITHO. CO. N.Y. (OSBORNE'S PROCESS)

UNITED STATES PATENT OFFICE.

ABRAHAM BASSFORD, OF NEW YORK, N. Y.

IMPROVED CUSHION FOR BILLIARD-TABLES.

Specification forming part of Letters Patent No. 5,952, dated December 5, 1848; Reissue No. 155, dated December 25, 1849.

*To all whom it may concern:*

Be it known that I, ABRAHAM BASSFORD, of the city and county of New York, in the State of New York, have invented a new and useful mode of constructing the cushion for a billiard or a bagatelle-table by a continuous tube, inflated with air or gas, made air-tight, constructed of sheet gum or india-rubber or other material; and I do hereby declare that the following is a full and exact description thereof.

The billiard-table or the bagatelle-table, being of an oblong shape, Figure 1, is supported upon six eagles, which form the rests or legs, as represented in the side and end views of the table, Fig. 1, *a a a*. The eagles are made of cast-iron, solid or hollow, according to the taste of the constructor, and a continuous iron rail rests upon the neck and wings of each eagle, Fig. 2, *b*, having three or five braces or supports, *c c c c c*. Two of the eagles are placed under each of the long sides and one under each end of the table. The frame of the bed is made in three sections, Fig. 4, *d e f*, making at the corners of *d* and *f* the necessary curves, *g g g g*, for the pockets, and in the outer stile of *e* making the necessary cuttings to admit the center pockets, *h h*. The panels which form the sections of the bed of the table *d*, *e*, and *f* are severally made of red cedar, mahogany, or any other wood, cut in squares of any given size which will suit the construction, (a difference in size not being essential,) six inches surface being a convenient shape, and in thickness one and a half or one and a quarter inch, *i i i*, Fig. 4, each square having a groove cut in it across the bed; and a tongue of iron or wood, (iron being preferable,) is driven through the muntins and each set of panels the whole width of the bed, Fig. 5, *k k k*, which manner of putting the panels together makes the bed stronger than if an alternate tongue and groove were cut in each square. A stile is framed around three sides of *d* and *f* and upon the ends of *e*, Fig. 4. Each section has five rails or muntins, *m m m*, or any other number, let into the stiles *n n n*, which, in addition to being let into the stiles *n n n*, Fig. 4, are braced with bars of cast-iron *o o o o*, Fig. 4, and *o o o o*, Fig. 3, which project and are let into a mortise, *o′ o′ o′ o′*, Fig. 4, the several sections being put together and bolted down to the rail which rests on the eagle, Fig. 2, *b*; the outside sections having four cast-iron bars bolted upon each, the bars projecting, the projection forming a tenon, which is let into a corresponding mortise, *e*, Fig. 4, in the cast-iron bars *p p*, which are let into the iron of the outer sections by a mortise.

The eagles to form the rests or legs may be put together to suit the taste of the constructor.

*a a*, Fig. 1, represent the surface or bed of a billiard-table or a bagatelle-table, with the cushion, rail, and pockets, and a continuous cushion extending entirely around the table, made as an air-tight tube, *b b*, passing outside the pockets $b^2$, Figs. 1 and 7, which tube may be inflated with air or gas by means of an air-pump, *c c*, Fig. 8. Fig. 7 represents one of the corners of the table and the manner in which the ends of the air-tight tubes are secured and fastened by means of plugs *c c*, Fig. 7, and *d d*, Fig. 9; and also the screw *e e*, Fig. 8, and *e e*, Fig. 9, to which the air-pump at *e e*, Figs. 8 and 9 is attached. The pocket-irons *f f*, Fig. 7, *g g*, Fig. 1, are covered with a leather covering, Fig. 10, *h h*. When the air-tight tube is sufficiently inflated a protection-plate, Fig. 12, is placed at one corner over the air-tube *c c c c*, Fig. 7, and fastened securely to the pocket-iron by two leather straps, Figs. 7 and 10, *l l*, the straps passing through the two holes *m m*, Figs. 11 and 12, and are buckled below the leather covering. The cushion-rail is represented by Fig. 6, *m m* and Fig. 1, *n n*, and an end view of the rail, the cushion in its place, Fig. 13, *o o*, and the manner of securing the rail to the bed with a screw-clamp $o\ o^2\ o\ o^2$.

The tube or cushion I construct as follows: First I prepare a mandrel of a cylindrical form to act as a base on which to attach the subsequent parts. This base is an elastic flexible cord composed of gum elastic or other like materials which will form a compact mass, as represented in the section of Fig. 9, where said mandrel is seen as placed within the tube or outer covering. I then take sheet india-rubber and cut it into strips of sufficient width to form the tube of the required size, Fig. 14, *p p*, taking care to pare down or bevel each edge, so that when rolled on the mandrel the lap will not form a ridge, as seen in Fig. 15, *q q*. The sheets, prepared as above, are then to be rolled hard upon the mandrel, the outer edge being cemented down at the place where it terminates on the roll. Finally, over this edge a thin narrow piece is cemented to insure its being air-tight. In order that the part composing the tube shall not adhere or stick to the mandrel, the latter is previously covered with thin cloth or some like substance, or may have a varnish applied which will effect the same object. Finally, the whole cylinder is covered with india-rubber cloth wrapped as many times around the outer casing of sheet india-rubber as will be required to make both the size of the cushion, and also act as a bandage to increase the strength of the tube to resist the pressure produced by inflation. This air or gas tight tube is made of sufficient length to reach entirely around the table, Fig. 1, *b b*, *b b*, *b b*, *b b*, passing outside whenever the tube passes a pocket, Fig. 1 $b^2$, Fig. 7 *b b*. The two ends of the tube before being filled with air or gas are closed with metallic plugs *c c c c*, Fig. 7, *d d*, Fig. 9, the ends of the tube being, after the insertion of the plugs, wound very tight with copper wire *r r*, Fig. 7, and *r r*, Fig. 9. Each plug has a valve in the end, which is inserted in the tube, Fig. 16, *s s*, Fig. 9, which is intended to prevent the air from escaping after the tube has been inflated, the valve admitting the air or gas, but self-acting by backward pressure. The tube, being now completed, is filled with air or gas by means of a force-pump applied at one of the screw-joints above described. The inflation will cause the tube formed on the mandrel to be distended, and thereby an air-space is formed between the mandrel and the innermost surface of the tube. The inflation is for the purpose of giving greater elasticity to the cushions, but by means of the inclosed mandrel of elastic material the cushion is also preserved both in shape and efficiency, if by accident or leaks the air should be discharged, in which case the whole would become solid. When the process of filling the tube is completed, it is ready to attach to the rail by making a groove on the inside of the rail, Fig. 6, *t t t t*, and Fig. 13, *t t*, of sufficient size to receive the inflated tube, and the tube cemented to the upper edge of the rail on the inside with any kind of cement which is strong enough to hold the tube in its place. I generally use india-rubber cement, an article well known among india-rubber dealers, for that purpose.

As before observed, when the tube is required to pass a pocket, whether at the corner, Fig. 1, $b^2$, or at the center of the long side, Fig. 1, $b^2$, it will pass outside the pocket. When carried all around the table, and properly secured in its place, the tube is covered with a suitable material—generally with green billiard-cloth—extending from the upper edge of the groove where the tube is inlaid, and extending to the lower side of the rail, where it is secured to the bed, Fig. 13, *o o*.

Another method of fastening the air or gas tight tube to the cushion-rail is to place it in the groove made continuous, except at the pockets, as heretofore described, and cover the tube with muslin by tacking both the upper and lower edges of the muslin to the cushion-rail, confining the tube to the groove without the use of cement.

I do not consider the manner of securing the tube to the rail as essential. Many different ways will be suggested to the workman. If, however, it be requisite to lower the tube upon the rail—that is, toward the bed of the table—there may be a beveled piece of india-rubber cemented to the surface of the tube previous to the covering of green billiard-cloth being put on, so as to bring the upper surface of the tube parallel with the upper edge of the rail, and which will prevent the ball from bouncing (or hopping) when played or thrown against the tube.

The substance which I have found in practice to answer best for making the air-tight tube is sheet-gum or india-rubber. It may, however, be made of any material which will allow the elasticity of the air within it to have sufficient play. The tube may also be made of different shapes, the form not being essential, and the mandrel over which it is formed may be of different substances; or, instead of the mandrel, there may be used a cord, made of india-rubber and varnished, so that the sheet-rubber will not adhere to it. The cord is left inside of the air-tight tube, Fig. 14, *p p*; and if the tube should at any time from injury permit the escape of the air, it will nevertheless form a complete india-rubber cushion, as before described.

The elasticity of the cushion will be greater the more the tube is inflated. Any excess of pressure, however, will greatly increase the elasticity of the cushion, and even the mere pressure of the atmosphere within the tube, provided the ends are closed, will add to its elasticity and cause it to throw a ball farther than a common cushion.

I do not claim a valve of any peculiar shape, and the plug which is inserted in the tube to confine the air or gas may vary in shape; or any other material may be used which will confine the air or gas in the tube after it is inflated.

What I claim as my invention, and desire to secure by Letters Patent, is—

1. Constructing a billiard or bagatelle table cushion, consisting of an air-tight elastic tube formed upon and to be used in combination with a solid but flexible and elastic core, which core shall remain within the tube, and be permanently a part of the cushion, such cushion to be used inflated with air whenever extraordinary elasticity is required, or, on the other hand, capable of being used as a solid elastic cushion whenever, through accident or choice, the tube part is permitted to lose the air by which it was inflated.

2. The application of air or gas in a tube or tubes of india-rubber or other elastic material to form the cushion of a billiard or bagatelle table, as described.

3. The mode of extending the tube or cushion in one length around the table, in consequence of which the tubes or cushions may be inflated at the same time with one air-pump, whereby all parts are equally inflated and are of equal elasticity.

ABM. BASSFORD.

Witnesses:
WM. H. PERKINS,
ISAAC O. BARKER.